(12) United States Patent
Yegin et al.

(10) Patent No.: US 8,949,957 B2
(45) Date of Patent: Feb. 3, 2015

(54) METHOD AND SYSTEM FOR CREATING A MOBILE INTERNET PROTOCOL VERSION 4 CONNECTION

(75) Inventors: Alper Yegin, Bangalore (IN); Ji Cheol Lee, Bangalore (IN); Ra-javelsamy Ra-Jadurai, Bangalore (IN); Sung Ho Choi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 13/063,998

(22) PCT Filed: Sep. 15, 2009

(86) PCT No.: PCT/KR2009/005223
§ 371 (c)(1),
(2), (4) Date: Mar. 15, 2011

(87) PCT Pub. No.: WO2010/030149
PCT Pub. Date: Mar. 18, 2010

(65) Prior Publication Data
US 2011/0179474 A1    Jul. 21, 2011

(30) Foreign Application Priority Data
Sep. 15, 2008   (IN) .................................... 2240/2008

(51) Int. Cl.
*G06F 21/30*    (2013.01)
*H04L 29/06*    (2006.01)
(Continued)

(52) U.S. Cl.
CPC .............. *H04L 63/06* (2013.01); *H04L 63/123* (2013.01); *H04W 12/04* (2013.01); *H04W 12/10* (2013.01)
USPC ............................... 726/6; 713/155; 380/270

(58) Field of Classification Search
CPC ..... H04L 63/06; H04L 63/123; H04W 12/04; H04W 12/10
USPC ................................ 726/6; 713/155; 380/270
See application file for complete search history.

(56) References Cited

U.S. PATENT DOCUMENTS 7,634,253 B2 * 12/2009 Plestid et al. .................. 455/411
8,230,212 B2 *  7/2012 Feder et al. .................... 713/155
(Continued)

FOREIGN PATENT DOCUMENTS

CN         101227494 A    7/2008
WO      2007-080549 A1    7/2007

OTHER PUBLICATIONS

3GPP TS 33.402 V2.0.0 (May 2008).*
(Continued)

*Primary Examiner* — Saleh Najjar
*Assistant Examiner* — Oleg Korsak
(74) *Attorney, Agent, or Firm* — Jefferson IP Law, LLP

(57) ABSTRACT

A method for creating a unique and secure mobile internet protocol version 4 connection for a packet data network is provided. The method includes generating an extended master session key to create a mobile internet protocol root key. The method also includes creating a mobile internet protocol security parameter index based on the mobile internet protocol root key and an access point name. The method further includes deriving a mobile node home agent key based on the access point name. Furthermore the method includes associating the derived mobile node home agent key to the created security parameter index. Moreover the method includes providing the unique and secure mobile internet protocol version 4 connection to transfer data for the packet data network connectivity.

14 Claims, 4 Drawing Sheets

(51) Int. Cl.
*H04W 12/04* (2009.01)
*H04W 12/10* (2009.01)

(56) References Cited

U.S. PATENT DOCUMENTS

| | | |
|---|---|---|
| 2005/0025091 A1 | 2/2005 | Patel et al. |
| 2005/0190734 A1* | 9/2005 | Khalil et al. .................. 370/338 |
| 2007/0297377 A1 | 12/2007 | McCann et al. |
| 2008/0059792 A1 | 3/2008 | Feder et al. |
| 2008/0072047 A1 | 3/2008 | Sarikaya et al. |

OTHER PUBLICATIONS

3GPP TSG SA WG3 Security#32 (S3-030044 9—Feb. 13, 2004).*
Mobility Management in IP Networks, Sami Ala-Luukko, 2000.*
3GPP TS 23.003 V6.15.0 (Dec. 2007), p. 23.*
Technical Specification Group Services and System Aspects; Generic Authentication Architecture (GAA); Mar. 2004; Generic Bootstrapping Architecture (Release 6), 3GPP TS 33.220 V1.2.1.
Samsung, "Bootstrapping MIPv4 Parameters", Apr. 2008, 3GPP TSG SA WG3 Security #51, S3-080477.

* cited by examiner

100

METHOD AND SYSTEM FOR CREATING A MOBILE INTERNET PROTOCOL VERSION 4 CONNECTION

TECHNICAL FIELD

The present disclosure, in general, relates to interworking networks, and in particular, to create and secure mobile internet protocol version 4 (MIPv4) signaling in the interworking networks during packet data network (PDN) connectivity.

BACKGROUND ART

In Evolved Packet System (EPS), a Packet Data Network (PDN) is represented as Access Point Name (APN) and a PDN connection is an association between a Mobile Node (MN) for example an User Equipment (UE), and a Home Agent (HA), through a Foreign agent (FA), represented by at least one of an internet protocol version 4 (IPv4) address and an internet protocol version 6 (IPv6) prefix or address. When a UE access the Evolved Packet Core (EPC) of the EPS through a non-3rd Generation Partnership Project (3GPP) access network and the PDN Gate Way (GW) in the EPS having the HA functionality, for mobility management the EPS supports the host based MIPv4 protocol.

The EPS further supports multiple PDN connectivity from the non-3GPP access. Multiple PDN connection is supported based on the network policies, non-3GPP access and type of user subscription. Multiple PDN connection enables parallel access to multiple PDNs by the UE, and allows simultaneous exchange of IP traffic between the UE and the multiple PDNs through a separate PDN GWs or a single PDN GW. As the UE can trigger requests for additional PDN, it can equally trigger requests for disconnection from any PDN. The non-3GPP access networks, for example worldwide interoperability for microwave access (WiMAX), Wireless Fidelity (Wi-Fi), may not consider MIPv4 for supporting multiple PDN connections. The 3GPP networks for example the EPS network support multiple PDN connections. As per 3GPP, multiple PDN connections through 3GPP network require separate security associations per IP connectivity or PDN connectivity or PDN connection to maintain consistent behavior irrespective of the multiple PDN connections are with the same HAs or different HAs. However, the security associations per IP connectivity are not robust.

DISCLOSURE OF INVENTION

Technical Problem

In light of the foregoing discussion, there is a need of a method and a system for creating a unique and secure mobile internet protocol version 4 connection for a packet data network between one of the HA and the UE and also between the FA and the UE.

Solution to Problem

An example of a method for creating a unique and secure MIPv4 connection for a PDN includes, generating an extended master session key to create a mobile internet protocol root key creating a mobile internet protocol security parameter index based on the mobile internet protocol root key and an access point name (APN). The method also includes deriving a mobile node home agent (MN_HA) key based on the APN. The method further includes deriving a mobile node foreign agent key based on the APN. Furthermore the method includes associating the derived mobile node home agent key and mobile node foreign agent key to the created security parameter index. Moreover the method includes providing the unique and secure MIPv4 connection to transfer data for the packet data network connectivity.

An example of a system for creating a unique and secure mobile internet protocol version (MIPv4) connection includes an extended master session key generator to generate an extended master session key. The system also includes a root key creator to create a mobile internet protocol root key. The system further includes a security parameter index creator to create the security parameter index. Furthermore, the system includes a mobile node home agent key creator to derive a mobile node home agent key. Moreover the system includes a mobile node foreign agent key creator to derive a mobile node foreign agent key.

Advantageous Effects of Invention

Embodiments of the present disclosure described herein provide a method and system for creating a unique and secure mobile internet protocol version 4 (MIPv4) connection for a packet data network (PDN).

BRIEF DESCRIPTION OF DRAWINGS

The accompanying figures, similar reference numerals may refer to identical or functionally similar elements. These reference numerals are used in the detailed description to illustrate various embodiments and to explain various aspects and advantages of the present disclosure.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

MODE FOR THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for creating a unique and secure mobile internet protocol version 4 connection per PDN.

Figure 1:
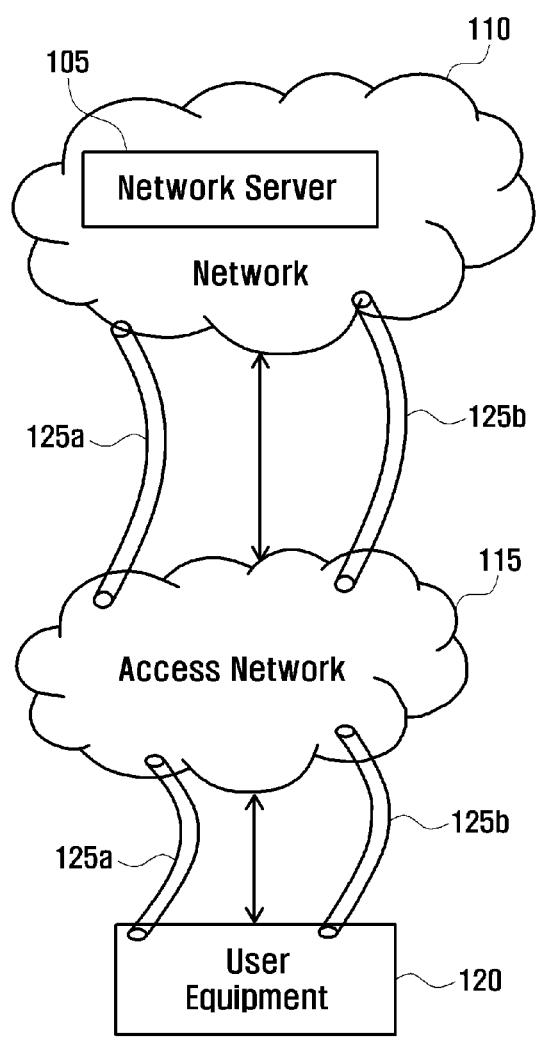
FIG. 1 is a block diagram of an environment, in accordance with which various embodiments can be implemented.

FIG. 1 is a block diagram of an environment 100, in accordance with which various embodiments can be implemented. The environment 100 includes a network server 105, a network 110 and a access network 115 for communicating information. An example of the network 110 is a 3rd Generation Partnership Project (3GPP) Evolved Packet Core (EPC) network. An example of the access network 115 is a worldwide interoperability for microwave access (WiMAX) network. In one embodiment, the network server 105 is present within the network 110. In another embodiment, the network server 105 can be connected externally with the network 110. The network server 105 can be a 3GPP authentication, authorization and accounting (AAA) server.

User equipment (UE) 120 is in constant communication through the network 105. In the exemplary scenario, the UE 120 enters the vicinity of the network 115. The UE 120 tries to contact network 110 through network 115.

The network 110 uses a dedicated PDN connectivity to communicate with the UE 120, for each service. The PDN connectivity is 125a and 125b as shown in FIG. 1. Examples of the services are internet connectivity, an IP Multimedia Service (IMS) and an emergency call.

In one embodiment, the user equipment includes at least one of a MN HA key creator, a MN FA key creator and a SPI creator. A similar set of keys are created in the UE and the network server for authenticating the communication.

Figure 2:
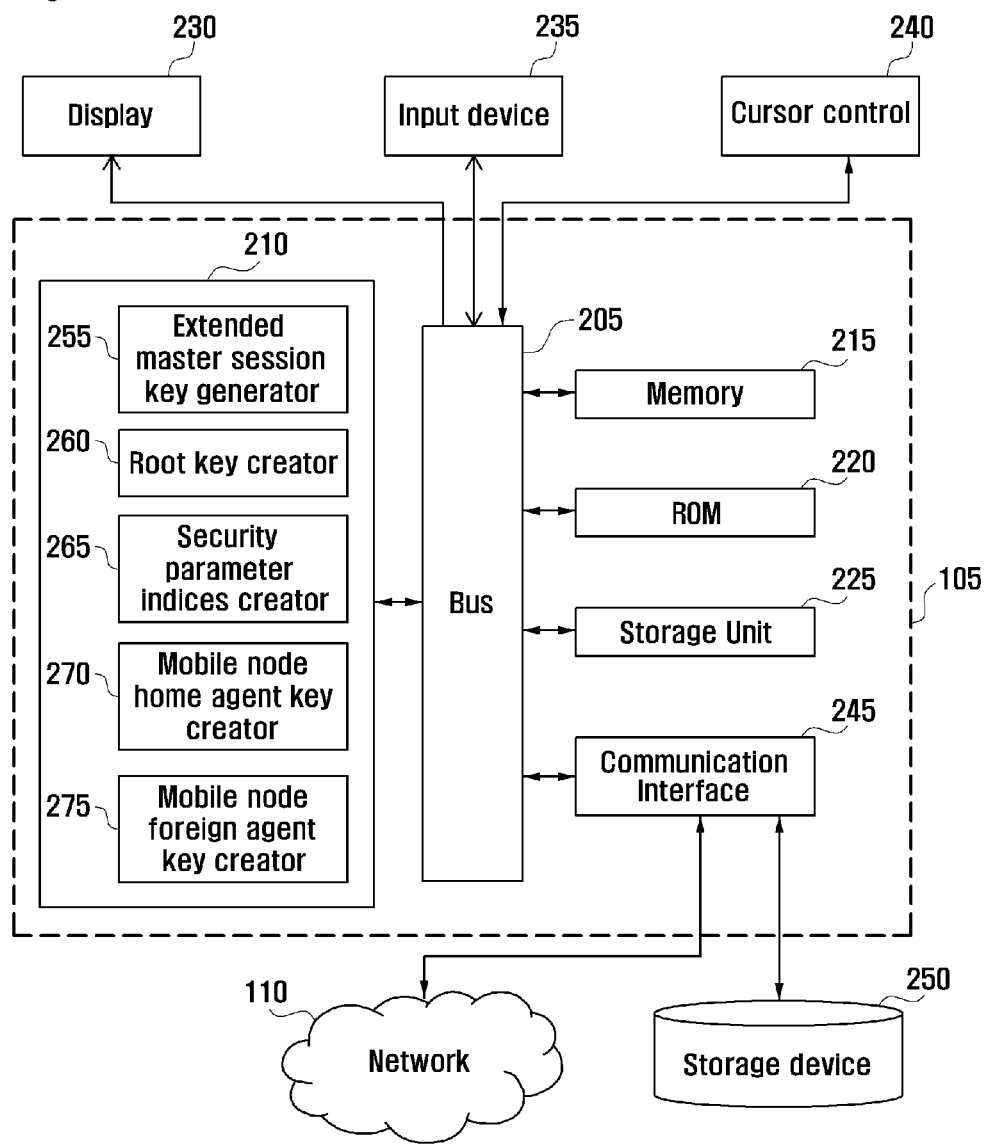
FIG. 2 is a block diagram of user equipment and network server creating a unique and secure mobile internet protocol version 4 connection for a packet data network, in accordance with one embodiment.

FIG. 2 is a block diagram of network server 105 for creating a unique and secure mobile internet protocol version 4 connection, in accordance with one embodiment.

The network server 105 and the UE 120 includes a bus 205 or other communication mechanism for communicating information. The network server 105 and the UE 120 includes a processor 210 coupled with the bus 205. The processor 210 can include an integrated electronic circuit for processing and controlling functionalities of the network server 105 and the UE 120. The network server 115 and the UE 120 also includes a memory 215, such as a random access memory (RAM) or other dynamic storage device, coupled to the bus 205 for storing information which can be used by the processor 210. The memory 215 can be used for storing any temporary information required. The network server 105 and the UE 120 further includes a read only memory (ROM) 220 or other static storage device coupled to the bus 205 for storing static information for the processor 210. A storage unit 225, such as a magnetic disk or optical disk, is provided and coupled to the bus 205 for storing information.

The network server 105 and the UE 120 can be coupled via the bus 205 to a display 230, such as a cathode ray tube (CRT), a liquid crystal display (LCD) or a light emitting diode (LED) display, for displaying information. An input device 235, including alphanumeric and other keys, is coupled to the bus 205 for communicating an input to the processor 210. The input device can be included in the network server 105. Another type of user input device is a cursor control, such as a mouse, a trackball, or cursor direction keys for communicating the input to the processor 210 and for controlling cursor movement on the display 230. The input device 235 can also be included in the display 230, for example a touch screen.

Various embodiments are related to the use of the network server 115 and the UE 120 for implementing the techniques described herein. In one embodiment, the techniques are performed by the processor 210 using information included in the memory 215. The information can be read into the memory 215 from another machine-readable medium, such as the storage unit 225.

The term "machine-readable medium" as used herein refers to any medium that participates in providing data that causes a machine to operate in a specific fashion. In an embodiment implemented using the network server 105, various machine-readable medium are involved, for example, in providing information to the processor 210. The machine-readable medium can be a storage media. Storage media includes both non-volatile media and volatile media. Non-volatile media includes, for example, optical or magnetic disks, such as the storage unit 225. Volatile media includes dynamic memory, such as the memory 215. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fiber optics, including the wires that include the bus 205. Transmission media can also take the form of acoustic or light waves, such as those generated during radio-wave and infrared data communications. The network server 105 also includes a communication interface 245 coupled to the bus 205. The communication interface 245 provides a two-way data communication coupling to the network 110. The network 110 used may be a Bluetooth Pico-net network structure.

In some embodiments, the network server 115 and the UE 120 can be connected to the storage device 250 for storing or fetching information. Examples of the storage device 250 includes, but are not limited to, a flash drive, a pen drive, a hard disk or any other storage media.

In one embodiment, the processor 210 can include or can be connected to one or more processing units, for example an extended master session key generator 255, a root key creator 260, security parameter indices creator 265, a mobile node home agent key creator 270 and a mobile node foreign agent key creator 275. The extended master session key generator 255 generates an extended master session key based on an extensible authentication protocol-authentication of key agreement (EAP-AKA). The root key creator 260 creates a root key. The security parameter indices creator 265 creates mobile internet protocol security parameter indices. The mobile node home agent key creator 270 derives a mobile home agent key. The mobile node foreign agent key creator 275 derives a mobile node foreign agent key.

In another embodiment, the network server 115 and the UE 120 may not include the processing units as the functions of the one or more processing units can be performed by the processor 215.

Figure 3:
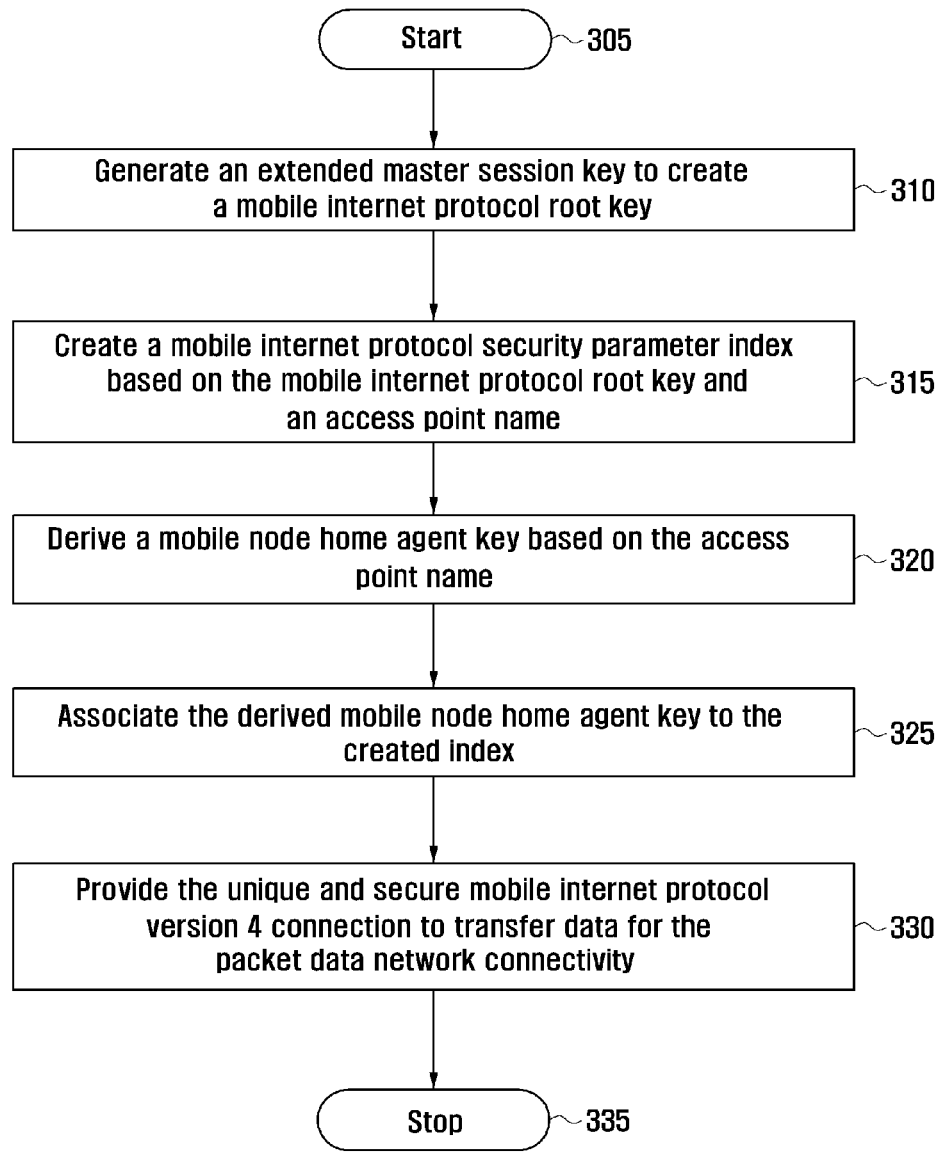
FIG. 3 is a flowchart illustrating a method creating a unique and secure mobile internet protocol version 4 connection for a packet data network, in accordance with one embodiment.

FIG. 3 is a flowchart illustrating a method creating a unique and secure mobile internet protocol version 4 (MIPv4) connection for a packet data network (PDN), in accordance with one embodiment.

The method starts at step 305.

A mobility protocol, for example MIPv4 foreign agent care-of-address (FACoA), is selected by the EPC, then the UE and the EPC derive a plurality of keys.

At step 310, an extended master session key (EMSK) is generated based on an extensible authentication protocol-authentication of key agreement (EAP-AKA) in the UE and in the network server. In one embodiment, generating is initiated based on at least one of a MIPV4 request and a process of switching on a user device.

The generated EMSK is then used to create a mobile internet protocol root key (MIP-RK) at the 3GPP AAA server and at the UE. The creating of the mobile internet protocol root key is based on the following equation:

$$MIP\text{-}RK=KDF(EMSK, \text{"Mobile IP Root Key"}|\text{"}\backslash 0\text{"}|length)$$

Where, MIP-RK—Mobile internet protocol root key;
EMSK—Extended master session key In one embodiment, a unique mobile node home agent (MN-HA) key, a mobile node foreign agent (MN-FA) key and a security parameter (SPI) index value for each packet data network connectivity is created using the access point name (APN) of the PDN.

At step 315, mobile internet protocol security parameter index (MIP-SPI) is created at the user equipment and at the 3GPP AAA server for a PDN connection represented in APN. The APN format is specified in 3GPP technical specification (TS) 23.003. The creating of the MIP-SPI is based on the MIP-RK and the APN using the following equation:

$$MIP\text{-}SPI=\text{the 4MSB of } HMAC\text{-}SHA256(MIP\text{-}RK, \text{"SPI Mobile IP ROOT KEY"}|APN)$$

Where, MIP-SPI mobile internet protocol-security parameter indices
HMAC-SHA hash message authentication code-secure hash algorithm
MIP-RK mobile internet protocol root key
APN Access point name The MIP-SPI is used by the UE, HA, FA and 3GPP AAA server to identify the MN-HA key, FA-RK key and MN-FA key used to compute the MN-HA Authentication Extension (MN-HA AE) and MN-FA Authentication Extension (MN-FA AE) in the MIPv4 Registration Request (RRQ) message.

At step 320, a mobile node home agent key is derived based on the APN and based on the MIP-RK for a PDN connection represented in APN at the UE and at the 3GPP AAA server. The deriving of the mobile node home agent (MN-HA) key is based on the following equation:

$$MN\text{-}HA=HMAC\text{-}SHA1(MIP\text{-}RK, \text{"MIP4MN HA Key"}|HA\text{-}IPv4|MN\text{-}NAI|APN)$$

Where, MN-HA mobile node-home agentmobile internet protocol
HMAC-SHA hash message authentication code-secure hash algorithm
MIP-RK mobile internet protocol root key
APN access point name
HA-IPv4 Internet protocol version 4 address of the home agent
MN-NAI Mobile node network access identifier At step 325, the derived mobile node home agent key is associated to the created index.

At step 330, the unique and secure IP connectivity is provided for transfer of signaling message and data for that PDN connectivity. The providing includes sharing the index and procuring associated MN-HA key and associated MN-FA key. The providing also includes providing a dedicated IP connectivity with unique security association for each service based on the access point name.

In some embodiments, a mobile node foreign agent key is derived based on the APN and the FA-RK. The FA-RK is derived at the 3GPP AAA server and at the UE. The MN-FA key is derived at the FA and at the UE. The derived MN-FA key is associated to the created SPI in step 315 and the unique and secure IP connectivity for transfer of signaling message and data is provided based on the MN-FA key. The deriving of the FA-RK and the MN-FA key is based on the following equation:

$$FA\text{-}RK=HMAC\text{-}SHA1(MIP\text{-}RK, \text{"FA-RK"})$$

$$MN\text{-}FA=HNAC\text{-}SHA1(FA\text{-}RK, \text{"MN FA"}|FA\text{-}IP|MN\text{-}NAI|APN)$$

Where, MN-FA mobile node-foreign agentmobile internet protocol
FA-RK foreign agent root key
HMAC-SHA hash message authentication code-secure hash algorithm
MIP-RK mobile internet protocol root key
APN access point name
FA-IP Internet protocol version 4 address of the foreign agent
MN-NAI MNs Network Access Identifier The method stops at step 335.

Figure 4:
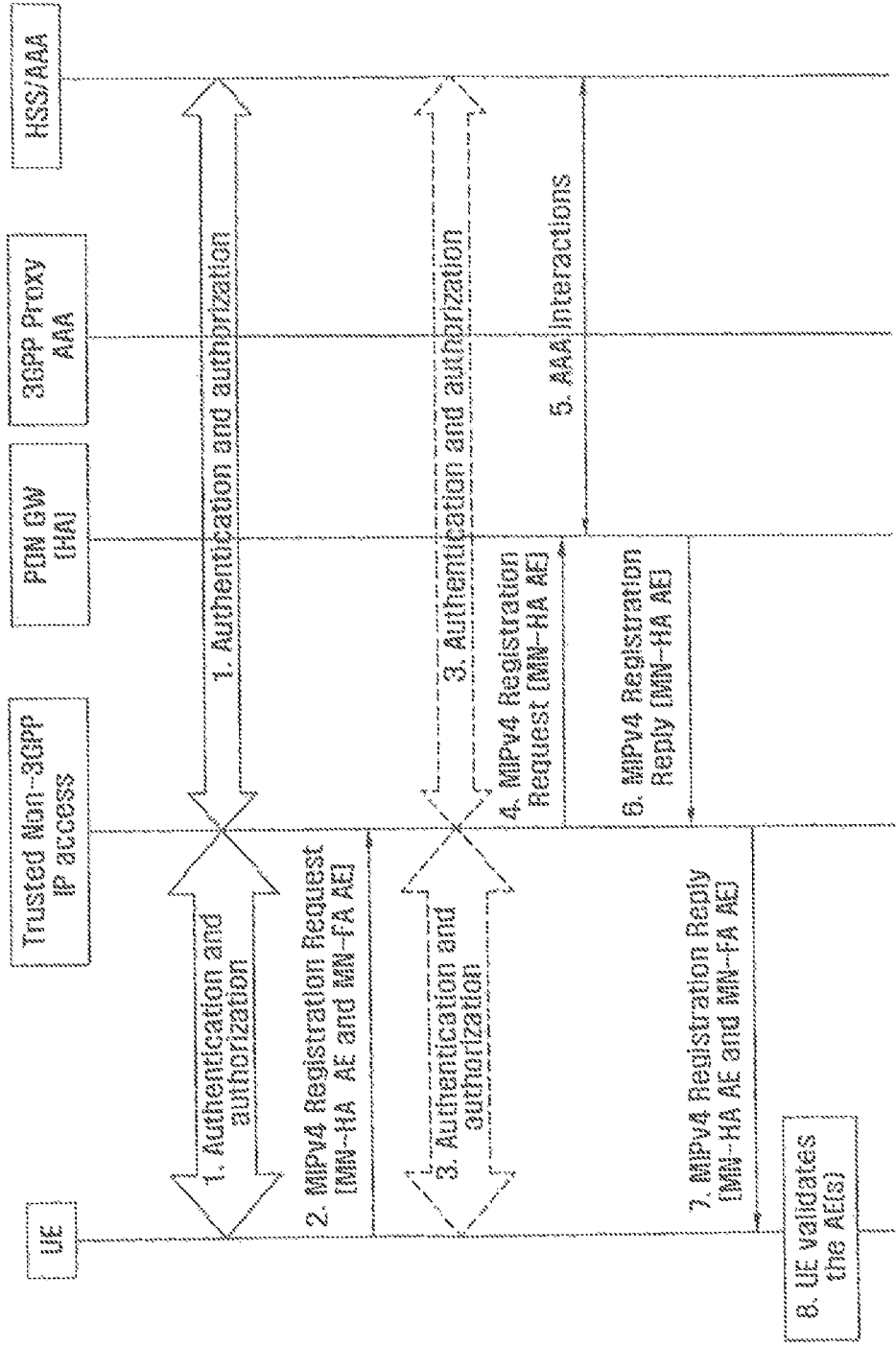
FIG. 4 illustrates creating a unique and secure mobile internet protocol version 4 connection for a packet data network, in accordance with the prior art.

FIG. 4 illustrates creating a unique and secure mobile internet protocol version 4 connection for a packet data network, in accordance with the prior art.

At process1, when an UE is turned on, the non-3GPP access specific authentication procedure based on EAP-AKA with the EPC is performed for attaching the UE to the EPC. The PDN GW address (HA address) is determined based on the type of non-3GPP access.

The PDN GW address (HA address) can be determined, based on the APN and the type of non-3GPP access system. If the network selects mobility management protocol as MIPv4 Foreign agent care-of-address (FACoA) for the UE, then the UE and the EPC (3GPP AAA server) derive the keys required for MIPv4 bootstrapping for the PDN connection. A unique MIP-SPI, MN-HA and MN-FA key are generated for the PDN connection as described in the present disclosure.

At process2, the UE sends a registration request (RRQ) message to the FA. In one embodiment, the UE includes a MN-HA authentication extension. In another embodiment, the UE includes MN-FA authentication extension. The authentication extensions are created as specified in TS 33.402. The APN is included in the RRQ message as specified in TS 23.402.

At process4, the FA processes the message based on a RFC 3344. The FA then validates the MN-FA authentication extension. The FA obtains authentication and authorization (MN-FA key and other parameters) information from the authentication, authorization, and accounting (AAA) server before the process 2. Further, the FA forwards the registration request (RRQ) message to the PDN GW. The RRQ message is protected between the FA and the PDN GW based on a 3GPP TS 33.210.

At process 5, the selected PDN GW obtains authentication and authorization information (MN-HA key and other parameters) from the AAA server, where AAA server might be co-located with the home subscriber servers (HSS).

At process 6, the PDN GW validates the MN-HA authentication extension (MN-HA AE). The PDN GW then sends a MIPv4 registration reply (RRP) to the UE through the FA. The RRP message is protected between the PDN GW and the FA according to the 3GPP technical specification (TS) 33.210.

At process 7, the FA processes the RRP according to RFC 3344. The FA then forwards the MIPv4 RRP message to the UE. The FA includes the MN-FA authentication extension, if the FA is received MN-FA authentication extension in the RRQ message.

At process 8, the UE validates the MN-HA authentication extension and MN-FA authentication extension if present.

In another embodiment, when the UE requests for a registration, the non-3GPP access specific authentication procedure based on EAP-AKA is performed. This is as explained in process 3.

In another embodiment, when the attached UE initiates a new PDN connection (multiple PDN connection), then unique MN-HA key, MN-FA key and SPI are generated in the UE and in the EPC for this new PDN connection, using the APN of this PDN and the existing MIP-RK and FA-RK keys.

An exemplary process of generating MIPv4 MN-HA key is illustrated as:

MN-HA=HMAC-SHA1(MIP-RK,"MIP4MN HA Key"|HA-IPv4|MN-NAI|APN)

When the APN is used with a key derivation to create unique keys for a PDN connectivity, then the key derivation is illustrated as:

For the Emergency Call: MN-HA=HMAC-SHA1 (MIP-RK, "MIP4 MN HA Key"|HA-IPv4 |MN-NAI|sos.apn.epc.mnc012.mcc345.pub.3gppnetwork.org)

here a unique MN-HA key is generated for the emergency Call (using the key "MIP-RK", label "MIP4 MN HA Key", using APN as sos.apn.epc.mnc012.mcc345.pub.3..gppnetwork.org)

For the Internet Access: MN-HA=HMAC-SHA1 (MIP-RK, "MIP4 MN HA Key"|HA-IPv4|MN-NAI|internet.apn.epc.mnc015.mcc234.3gppnetwork.org)

here a unique MN-HA key is generated for the internet access (using the MIPv4 root key key "MIP-RK", label "MIP4 MN HA Key", using APN as internet.apn.epc.mnc015.mcc234.3gppnetwork.org)

Industrial Applicability

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

The invention claimed is:

1. A method for connecting a packet data network (PDN), the method comprising:
   generating a mobile internet protocol root key (MIP-RK) from an extended master session key (EMSK);
   generating a mobility key using the MIP-RK and an access point name (APN) for the PDN;
   connecting to the PDN using the mobility key;
   generating another mobility key using another APN for another PDN; and
   connecting to the another PDN using the another mobility key.

2. The method of claim 1, wherein the generating the mobility key comprises:
   generating security parameter indices (SPI) from the MIP-RK; and
   identifying a mobile node home agent (MN-HA) key and a mobile node foreign agent (MN-FA) key using the SPI.

3. The method of claim 2, wherein the connecting the PDN uses the SPI, the MN-HA key, and the MN-FA key to connect the PDN.

4. The method of claim 1, wherein the APN represents the PDN for connecting.

5. The method of claim 1, wherein the MIP-RK is generated at an authentication, authorization and accounting (AAA) server and an user equipment (UE).

6. The method of claim 1, wherein the mobility keys are generated at an authentication, authorization and accounting (AAA) server and an User Equipment (UE).

7. The method of claim 6, further comprising:
   transporting the mobility keys from the AAA server to an home agent (HA).

8. An apparatus for connecting a packet data network (PDN), the system comprising:
   a root key creator for generating a mobile internet protocol root key (MIP-RK) from an extended master session key (EMSK);
   a key creator for generating a mobility key using the MIP-RK and an access point name (APN) and for generating another mobility key using another APN for another PDN; and
   a processor for connecting to a PDN using the mobility key and for connecting to the another PDN using the another mobility key.

9. The apparatus of claim 8, wherein the key creator comprises:
   a security parameter indices creator for generating security parameter indices (SPI) from the MIP-RK; and
   a mobile node home agent key creator and a mobile node foreign agent key creator for identifying a mobile node home agent (MN-HA) key and a mobile node foreign agent (MN-FA) key using the SPI.

10. The apparatus of claim 9, wherein the processor uses the SPI, the MN-HA key, and the MN-FA key to connect the PDN.

11. The apparatus of claim 8, wherein the APN represents the PDN for connecting.

12. The apparatus of claim 8, wherein the MIP-RK is generated at an authentication, authorization and accounting (AAA) server and an user equipment (UE).

13. The apparatus of claim 8, wherein the mobility keys are generated at an authentication, authorization and accounting (AAA) server and an user equipment (UE).

14. The apparatus of claim 13, wherein the mobility keys are transported from the AAA server to an home agent (HA).

* * * * *